United States Patent Office 3,335,149
Patented Aug. 8, 1967

3,335,149
THIAZOLE DIAMINES
Jack Preston, Raleigh, N.C., assignor to Monsanto Company, St. Louis, Mo., a corporation of Delaware
No Drawing. Original application Aug. 21, 1963, Ser. No. 303,671. Divided and this application Apr. 29, 1965, Ser. No. 451,982
3 Claims. (Cl. 260—302)

This is a division of application Ser. No. 303,671, filed Aug. 21, 1963, and now abandoned.

This invention relates to new diamines. More particularly, the invention relates to the provision and preparation of new symmetrical aromatic diamines containing two thiazole linkages separated by a hydrocarbon radical.

Certain compositions of aromatic polymers, particularly aromatic polyamides, have been found to be very thermally resistant. Improvements have been sought, however, on the theory that condensation polymers having heterocyclic linkages in the main chain instead of amide linkages will be more stable because of several considerations. Heterocyclic rings should be very stable because of resonance. Also, when a heterocyclic ring is ruptured, the polymer chain may still not be cleaved. At the present, polyheterocycles have been difficult to prepare in high molecular weight, although they have proved to be thermally resistant compositions. This invention presents new intermediates which consists of two aminoaryl units joined by means of a radical containing two heterocyclic linkages; these new intermediates may be polymerized with reactive intermediates to high molecular weight materials having thermally stable heterocyclic linkages, for example, polyamide-heterocycles in a very simple manner. The resulting polymers will possess characteristics of both wholly aromatic polyamides and polyheterocycles. Other thermally resistant polymers may also be prepared from these diamines, e.g., polyheterocycles having regularly recurring sequences of heterocyclic units.

It is an object of the invention to provide new symmetrical aromatic diamines containing non-adjacent thiazole linkages separated by a hydrocarbon radical.

It is another object of the invention to provide a process for the preparation of diamines containing two non-adjacent thiazole linkages separated by a hydrocarbon radical.

An additional object of the invention is to provide new diamines, containing two thiazole linkages of high temperature resistance, which are suitable as intermediates in the preparation of high molecular weight thermally resistant polymers.

Other objects and advantages of the invention will become apparent from the description which follows.

In general, the objects of the invention are attained by the provision of aromatic diamines which contain a central nucleus consisting of two thiazole linkages separated by a hydrocarbon radical. The central nucleus is bound on each side by means of multivalent aromatic hydrocarbon radicals terminating in amino groups. These new diamines may be represented by the general formula $$H_2N—Ar—X—Ar—NH_2$$

wherein Ar is a multivalent aromatic hydrocarbon radical having from 6 to 15 carbon atoms and X represents two symmetrical or unsymmetrical thiazole groups separated by an aromatic hydrocarbon radical and joined to Ar by single m- or p-valence bonds. When the diamine contains unsymmetrical thiazoles the overall symmetry of the diamine is preserved by placing the unsymmetrical thiazole units on each side of a central hydrocarbon radical in such a way that there is a plane of symmetry in the molecule.

The aromatic hydrocarbon radicals having from 6 to 15 carbon atoms as represented by Ar may be selected from single, multiple and fused ring radicals, for example

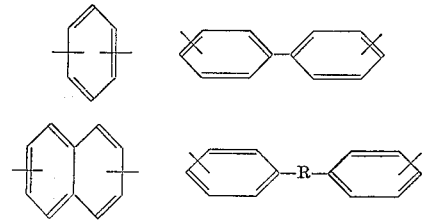

wherein R is —O—, —S—, $SO_2$—, $CH_2$—, or $C(CH_3)_2$, and similar aromatic radicals. These linkages may have substituents such as $NH_2$— or methyl attached to the rings.

As examples of the new symmetrical diamines of this invention which are embraced by the general formula, the following are typical and illustrative:

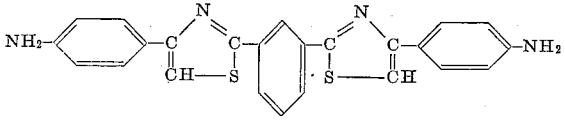

m-bis(4-p-aminophenylthiazol-2-yl)benzene

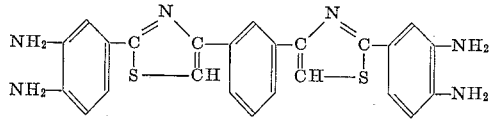

m-bis(2-m,p-diaminophenylthiazol-4-yl)benzene

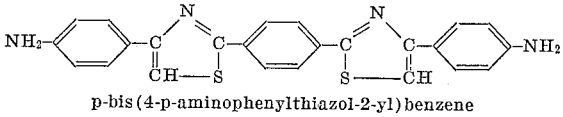

p-bis(4-p-aminophenylthiazol-2-yl)benzene

The new thiazole containing diamines of this invention can be prepared via a dinitro intermediate which in turn is reduced to the diamino compound containing the two central thiazole linkages. The two thiazole linkages are formed prior to the time that the dinitro intermediate is reduced and the reduction of the dinitro to the diamino compound does not involve the thiazole linkages themselves. A diamine substituted with amino groups may be produced by the preparation and reduction of a tetranitro derivative.

The dinitro intermediate may be prepared by any of several well known methods. The Schotten-Baumann or interfacial type reaction involves the use of the nitro aromatic acid chloride either alone or in a suitable solvent which will dissolve the acid chloride and which will at the same time not adversely affect the other component which is dissolved or dispersed in water. Suitable solvents include chloroform, tetrahydrofuran, benzene, benzonitrile, acetophenone, acetonitrile, dimethylacetamide and other solvents, tetrahydrofuran being preferred. The reaction mixture is then stirred rapidly until the reaction is completed and the dinitro compound is filtered from the reaction mixture. The choice of intermediate reactants will, of course, depend upon the type of heterocyclic linkages desired. The thiazole linkages may be formed by such reactions as a 2-chloro- or bromoacetophenone group and a thioamide group to yield a thiazole unit.

The reduction of the dinitro intermediate to the diamine may be effected by any of the well known reduction methods. For example, reduction may be accomplished by the use of catalytic reducing methods such as those involving the use of a palladium on charcoal catalyst typically employing 5 percent palladium on charcoal, a Parr hydrogenation unit or other unit. The reduction may also employ Raney nickel, cobalt and other similar heavy metal catalysts; reductions using these catalytic systems may be carried out in alcohol, in dimethylformamide, or similar compounds. Reduction is also possible using chemical reduction methods such as stannous chloride and hydrochloric acid, iron and sulfuric acid, sulfide solutions and the like.

The amounts of the various reactants which may be employed will, of course, depend on the type of linkage which is desired. In general, it may be stated that substantially stoichiometric proportions of the various reactants may be employed.

The novel diamines of this invention are useful in a variety of applications. For example, they may be polymerized to high molecular weight polyamide heterocycles in a very simple manner; thus, certain physical properties may be predetermined easily by selecting the proper amide group from a variety of polyamides and the proper heterocyclic group from a variety of polyheterocycles.

The reactivity of these compounds makes them useful in other reactions common to phenylene diamines. Unlike phenylene diamines which are subject to discoloration through oxidation, these new diamines are resistant to attack from air, light, moisture and common organic solvents. These novel diamines are thus more useful than phenylene diamines for many uses, such as the curing of epoxy resins to give products of good color. Polymers of excellent thermal resistance may be prepared from the diamines of the invention.

The following example is presented as a further disclosure and illustration of the new compositions of this invention and is not intended as a limitation thereof. All parts, proportions and percentages are by weight unless otherwise indicated.

EXAMPLE

This example describes the preparation of m-bis(4-p-nitrophenylthiazol-2-yl) benzene and its reduction to the diamine, m-bis(4-p-aminophenylthiazol-2-yl) benzene.

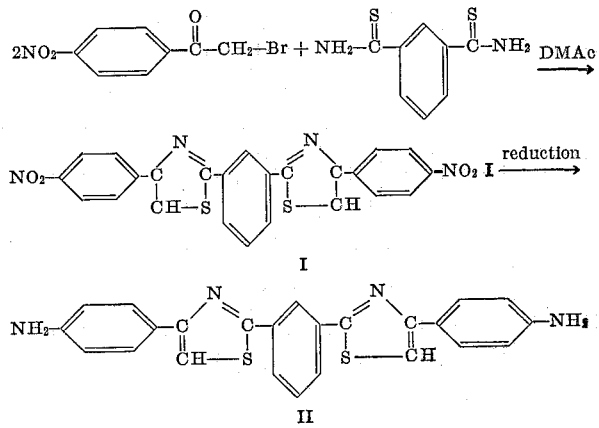

(A) *Preparation of I*

A solution of 24 g. (0.14 mole) isophthalidithioamide and 60 g. (0.28 mole) 2-bromo-4'-nitroacetophenone in 560 ml. dimethylacetamide (DMAc) was stirred together at room temperature. After the mixture was stirred for twenty hours, it was then poured into water, filtered and washed again in water. The yield of dried product was 50.4 g.; the M.P. of the product was 270–272° C.

*Analysis.*—Calc'd: C, 59.49; H, 2.91; N, 11.15. Found: C, 59.07, 59.04; H, 3.14, 2.89; N, 11.29, 11.07.

(B) *Preparation of II*

To a 1 liter hydrogenation bomb was added 40 gm. of I, 300 ml. DMAc, and 3 gm. Raney nickel catalyst. The system was sealed, pressured to 2000 p.s.i. with hydrogen, and heated to 100° C. Additional hydrogen under pressure was added to keep the pressure of the system above 2600 p.s.i. at 100° C. for four hours. The system was then cooled to 30° C.

The catalyst was removed by filtration and the filtrate was poured into 1.5 liters of water at 80° C. The white precipitate was collected and dried to yield 36.5 gm. of crude II, M.P. 210–215° C. A recrystallization of the crude product from 200 ml. methyl Cellosolve produced 27 gm. of II, M.P. 230–232° C.

*Analysis.*—Calc'd: C, 67.90; H, 4.27; N, 12.73. Found: C, 67.98, 67.75; H, 4.37, 4.40; N, 12.80, 12.60.

A chemical reduction of I to II was performed using stannous chloride and hydrochloric acid; the product was only slightly less pure than via the route given above.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:
1. P-bis(4-aminophenylthiazol-2-yl) benzene.
2. M-bis(4-p-aminophenylthiazol-2-yl) benzene.
3. M-bis(2-m,p-diaminophenylthiazol-4-yl) benzene.

References Cited

UNITED STATES PATENTS 2,726,246 12/1955 Trosken _____ 260—302
2,765,304 10/1956 Siegrist et al. _____ 260—307.7

ALEX MAZEL, *Primary Examiner.*

R. J. GALLAGHER, *Assistant Examiner.*